June 28, 1960     C. BRANDON     2,942,514
OPTICAL SCANNING SYSTEM

Filed Oct. 26, 1956     2 Sheets-Sheet 1

THE HOUSING 14 AND PRISMS 10 & 12 ARE ROTATABLE ABOUT CENTRAL AXIS 55

INVENTOR.
CHESTER BRANDON
BY W.R. Maltby
Lawrence S. Epstein
ATTORNEYS

June 28, 1960

C. BRANDON 2,942,514

OPTICAL SCANNING SYSTEM

Filed Oct. 26, 1956

INVENTOR.
CHESTER BRANDON
BY
Lawrence S. Epstein
ATTORNEYS

United States Patent Office 2,942,514
Patented June 28, 1960

2,942,514

OPTICAL SCANNING SYSTEM

Chester Brandon, Guaynabo, Puerto Rico, assignor to the United States of America as represented by the Secretary of the Navy Filed Oct. 26, 1956, Ser. No. 618,659

1 Claim. (Cl. 88—1)

This invention relates to a lens structure and particularly to a lens permitting a wide angle of light to be passed through an optical rotation cell such as a dove prism.

Simulations of radar equipment presentations are obtained by artificially producing such presentations by scanning a suitable relief map of the area and sending the video information so obtained, along with the proper synchronizing voltages, to the radar equipment. Scanning is accomplished by illuminating the relief map with a beam of light whose beam width corresponds to the beam width of a typical radar antenna system. By the use of an optical and reflection system, the light source is apparently placed at a position and altitude corresponding to the plane's position and altitude over the relief map. The light source is rotated or oscillated to correspond to various radar scanning systems. The terrain so illuminated is then viewed from above through a suitable optical system, by a television pickup tube and the video obtained is amplified and sent to the radar equipment.

In a practical application of the radar simulation, a frame retains the terrain map to be scanned, and a camera having an image orthicon tube with its associated focus is mounted above the terrain at 90° to the direction of movement of the terrain. The carriage mounting the camera also supports the timing chassis, scanner system and light source. Suitable means are provided to operate the device.

The scanner system includes the light source properly arranged to illuminate the relief map being used, an optical system, to which this invention relates, and an electrical system which enables the optical system and light source to follow the scan motions of the antenna system of the radar being used, raises and lowers the light source to simulate changes in planes, altitude, and provides synchro outputs for the radar indication.

In this manner, simulation of radar equipment presentations closely approximate what is seen in operational equipment. However, in order to obtain adequate presentations, it was necessary to provide a lens system which would permit up to 60° solid angle of light to effect the simulation. This was accomplished by the rotation cell of the invention.

An object of the invention is to provide a maximum angle which could be passed through an optical rotation cell.

Another object is to devise a system that would permit the object distance to be close to the objective and still cover the required field for the video or iconoscope pick-up.

Yet another object is to produce an image without doubling effect.

It is yet another object to maintain resolutions for a full field so that a full radar sweep is simulated.

Other objects and many of the attendant advantages of this invention will be readily appreciated as the same becomes better understood by reference to the following detailed description when considered in connection with the accompanying drawings wherein.

Referring to the figures, wherein like numbers are used to identify like parts through the several views, a pair of dove prisms 10 and 12 are adjustably retained in the prism housing 14. The prism members 10 and 12 are identical in construction, and are oppositely positioned in the housing 14.

Figure 3:
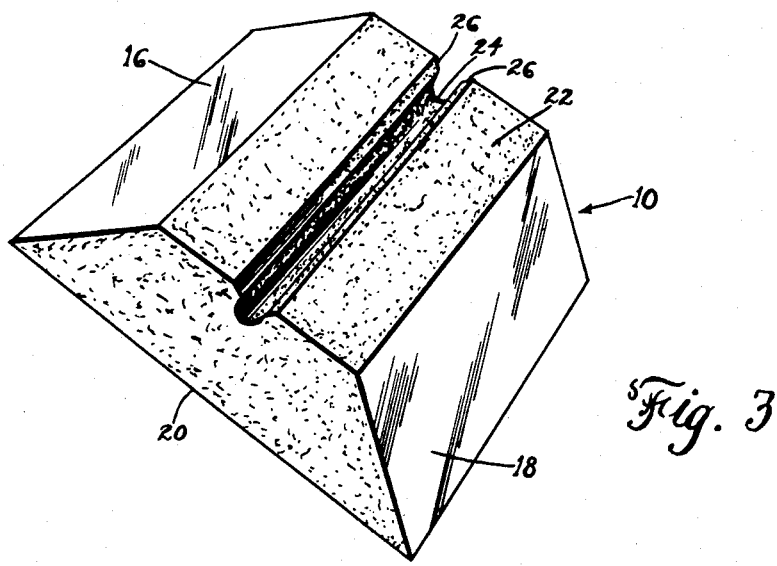
Figure 3 is a perspective view of one of the dove prisms.

As is clearly illustrated in Figure 3, the dove prism is rectangular in transverse horizontal section and is provided with the refracting surfaces 16 and 18 and a reflecting surface 20, which is parallel with the optical axis of the lens. Refracting sides 16 and 18 are at equal angles to reflecting surface 20. The refractive power of the glass of which prism 10 is made, bends the entering light (upwardly in Figure 4) so that it strikes the reflecting surface of the prism. The reflected beam then strikes the other end of the prism and during the passage to the air is refracted an amount equal to the first refraction on entering prism 10.

These properties of the dove prism are utilized in the invention. The optical system used to review a scanned area is accomplished by a special rotating construction consisting of a conventional picture taking lens (not shown) and a pair of prisms. Any image formed by this combination will actually rotate if the lens and prisms are rotated. The image revolves twice for every revolution of the optical system. The optical center of rotation corresponds to zero range.

However, it was found that in the use of a single dove prism, the limiting design parameter always fell upon the maximum angle which could be passed through an optical rotation cell. With a single objective and a conventional dove prism, the object distance would have to be about twenty feet from the objective in order to cover the required field for the iconoscope pick-up. Various systems known did not materially solve the problem.

Figure 4:
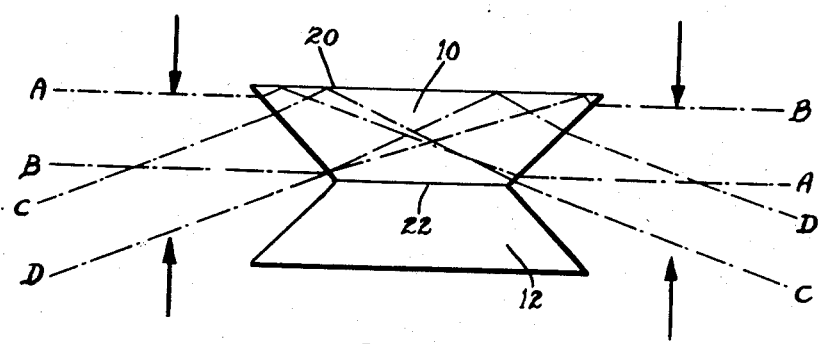
Figure 4 is a schematic view of the invention illustrating diagrammatically the field encompassed by the dove prisms.

When the pair of dove prisms 10 and 12 were mounted in the housing in the face-to-face position shown in the figures, it was discovered that the aperture of the prism system is reflected to be coincident with the aperture of the objective. This is illustrated in Figure 4, where both the axial pencil, represented between lines A, B and an oblique pencil, represented between lines C, D are included in the system. This system permits up to 60° solid angle of light working through an f3.5 photographic objective. As a result, it is possible to maintain resolutions for the full field of 50°, approximately ten times that of the radar P.P.I.

Figure 1:
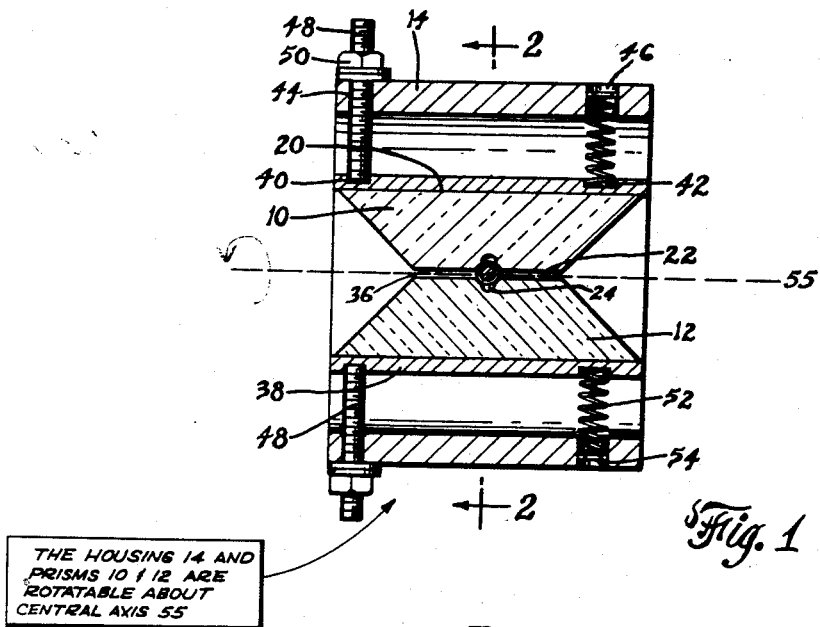
Figure 1 is a vertical section of the dove prism arrangement of the invention.
Figure 2:
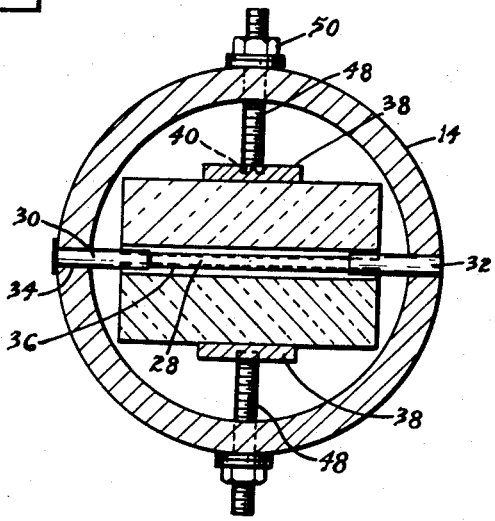
Figure 2 is a section transverse to that shown in Figure 1.

This system works perfectly for collimated light and therefore produces an image without doubling for an infinitely distant object. In planes other than infinity, doubling occurs. To remove doubling for any given object plane, the hinge mechanism shown in Figures 1 and 2 permits the two prisms 10 and 12 to be inclined to each other.

Since dove prisms 10 and 12 are identical in construction, description for one will suffice. Side 22, representing the shorter parallel side of the trapezoid prism 10 is at approximately the center of housing 14. Axial groove 24 extends across side 22 and contains beveled edges 26. Pivot rod 28 axially extends through groove 24 and is housed in sleeve members 30 and 32. Sleeve members 30 and 32 are tapped through apertures 34 in prism housing 14.

The diameter of sleeve members 30 and 32 is larger than the diameter formed by oppositely facing beveled edges 26 of prism members 10 and 12 and results in a space 26 between sides 22 when pivot rod 28 is seated in groove 24. This is clearly shown in Figures 1 and 2. This construction permits the dove prisms to be inclined to each other with relatively little friction during adjustment.

Flat bar members 38 extend longitudinally across the prism sides 20 and are recessed at the opposite ends 40 and 42. Holes 44 and 46 in housing 14 align with the recesses 40 and 42 respectively. Threaded bolt means 48 extend through holes 44 and seat in recesses 40. Locking means 50 retain the bolt means in the locked position. The tension springs 52 extend through holes 46 and seat in recesses 42. The springs are held in position by split rings 54.

Adjustment of locking means 50 causes the two prisms 10 and 12 to be inclined towards each other to completely remove doubling for any given object plane.

When the lens and prisms 10 and 12 are rotated in the radar simulation, the image that was formed will rotate twice for each revolution of the optical system. In order to align the optical elements, the objective (not shown) is collimated so it does not move laterally relative to its axis when the cell is rotated. Bolts 48 are adjusted so that the doubling image fuses into a single image for the required object plane. Housing 14 is positioned perpendicular to the optical axis in the direction perpendicular to the long dimension of the prisms so that the image rotates about a center point. Housing 14 and prisms 10 and 12 are rotated about axis 55 using conventional rotational mounting means. Thus, rotation of an image, without double images, is produced to closely simulate radar scan.

Obviously many modifications and variations of the present invention are possible in the light of the above teachings. It is therefore to be understood that within the scope of the appended claim the invention may be practiced otherwise than as specifically described.

What I claim is:

In an optical lens system having an optical axis, a device comprising two dove prisms, a rotatable housing, a pivot for said dove prisms mounted in said housing, and means for individually adjusting said dove prisms about said pivot; said housing being substantially cylindrical in shape and said optical axis being coincident with the axis of said housing, means provided for rotation of said housing for 360° about said optical axis, said pivot comprising a dowel rod substantially smaller in diameter than said cylindrical housing, said pivot extending through said housing in a direction perpendicular to said optical axis, said dove prisms being mounted in said housing about said pivot, said dove prisms having axially beveled portions on their shorter parallel faces, and said beveled portion being adjacent to said pivot the diameter of said beveled portions being smaller than the diameter of said pivot so that the prisms are spaced from each other, the shorter parallel faces of said dove prisms being in adjacent relation, said adjustment means engaging said dove prisms to fuse double images into a single image, and said adjustment means comprising bolt means and position locking means for securing said bolt means, said bolt means extending through said housing and engaging one end of each prism, with springs under compression counterbalancing the other ends of said dove prisms, whereby micrometer adjustment of said prisms is possible, inclining the two prisms to each other.

References Cited in the file of this patent

UNITED STATES PATENTS

| | | |
|---|---|---|
| 1,532,236 | Douglass | Apr. 7, 1925 |
| 1,878,967 | Mihalyi | Sept. 20, 1932 |
| 2,152,959 | Gilmore | Apr. 4, 1939 |
| 2,280,989 | Welch | Apr. 28, 1942 |
| 2,505,819 | Wrigley | May 2, 1950 |

FOREIGN PATENTS

| | | |
|---|---|---|
| 996,922 | France | Sept. 5, 1951 |